3,296,330
OLEFIN DISPROPORTIONATION
Fred T. Sherk, Bartlesville, Okla., assignor to Phillips Petroleum Company, a corporation of Delaware
Filed Apr. 16, 1962, Ser. No. 187,630
7 Claims. (Cl. 260—683)

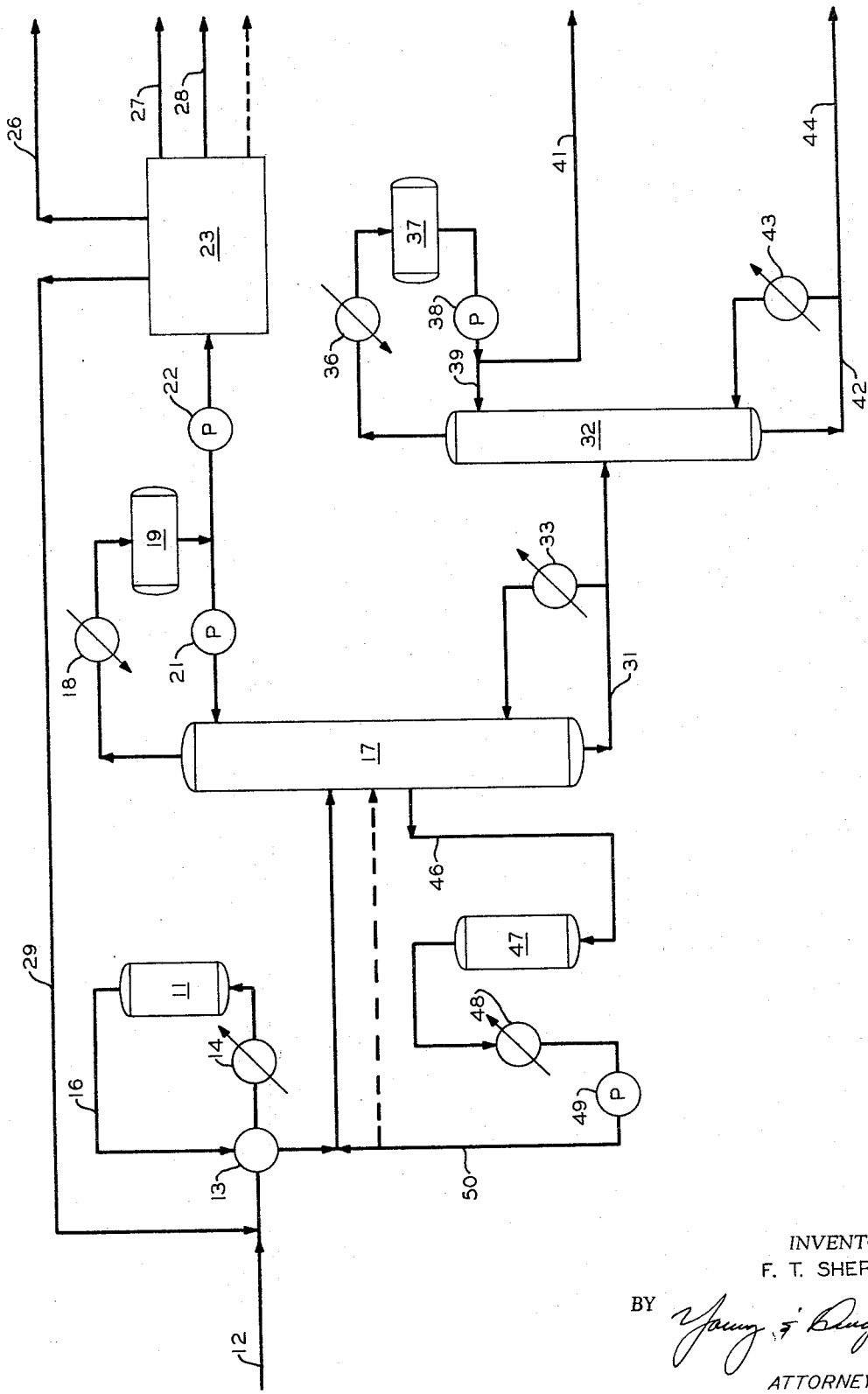

This invention relates to the disproportionation of olefin hydrocarbons. In one aspect the invention relates to the disproportionation of an acyclic olefin hydrocarbon by contact with a disproportionation catalyst. In another aspect this invention relates to a product of olefin disproportionation comprising a mixed stream of linear and lightly-branched acyclic olefins. In another aspect this invention relates to apparatus for disproportionating an olefin feed stream.

Frequently it is desirable to convert an olefin hydrocarbon into similar hydrocarbons of higher and lower numbers of carbon atoms per molecule. This can be accomplished by catalytic disproportionation utilizing a catalyst comprising molybdenum oxide and aluminum oxide and such a catalyst also including an oxide of cobalt. This catalytic disproportionation is disclosed and claimed in Serial No. 127,812, R. L. Banks, filed July 31, 1961. There are instances in which the primary need is for a lower molecular weight product as, for example, the production of ethylene from propylene. In other instances the primary need is for a higher molecular weight product or for specific higher and lower molecular weight products. Higher molecular weight olefins, for example, are used in the preparation of alkyl benzenes which are sulfonated in the production of detergents.

An object of my invention is to convert an olefin feed to hydrocarbons of higher and lower molecular weight.

Another object of my invention is to disproportionate an acylic olefin hydrocarbon by contact with a disproportionation catalyst to produce higher and lower molecular weight hydrocarbons.

Another object of my invention is to increase the production of higher and lower molecular weight products through the catalytic disproportionation of an intermediate feed.

Another object of my invention is to produce an olefin stream which is useful in the preparation of detergents.

Other aspects, objects and the advantages of my invention are apparent in the written description, the drawing and the claims.

According to my invention the disproportionation of an acyclic olefin hydrocarbon is accomplished by a continuous two-step process in which an acyclic olefin hydrocarbon is contacted with a first amount of disproportionation catalyst, the product separated into relatively high and low molecular weight fractions, the relatively low molecular weight fraction recovered and at least a portion of the relatively high molecular weight fraction contacted with a second amount of disproportionation catalyst.

Further according to my invention an acyclic olefin hydrocarbon is contacted with a disproportionation catalyst to produce a first disproportionated product, the first product passed into a separation zone, separated into relatively low molecular weight and relatively high molecular weight fractions and an intermediate molecular weight fraction, the relatively low and high molecular weight fractions recovered as products, and the intermediate fraction contacted in a second reaction zone with a disproportionation catalyst to produce additional high and low molecular weight fractions, and the resulting stream passed from the second reaction zone into the separation zone.

Further according to my invention there is provided apparatus for disproportionation comprising first and second disproportionation reactors and a separator, means to feed an acylic olefin into the first reactor, means to feed the product from the first reactor to the separator, means to recover higher and lower molecular weight fractions from the separator, means to feed an intermediate stream from the separator to the second reactor and means to feed the product of the second reactor into the separator. Olefins which are subjected to disproportionation according to the process of my invention in the first reaction zone are acyclic 1- and 2-alkenes having from 3 to 5 carbon atoms. These olefins include propylene, 1-butene, 2-butene, 1-pentene, 2-pentene, and 3-methyl-1-butene. Higher disproportionation conversion and wider product distribution are obtained with 1-olefins than with 2-olefins; 3-olefins do not undergo significant disproportionation. Of course, the feed stream can comprise other compounds, either as diluents or impurities, etc. For example, where the feed stream is substantially propylene often there are included in this stream appreciable quantities of ethylene. By disproportionation in this application is meant a reaction for the conversion of a hydrocarbon into similar hydrocarbons of higher and lower number of carbon atoms per molecule. Where the reactant comprises 1- or 2-olefins, a mixture of new products is obtained comprising primarily olefins having both a larger and a smaller number of carbon atoms than the feed olefin but also including other disproportionated products, for example, saturated hydrocarbons, and other converted and unconverted material.

Although disproportionation is the primary reaction in the first and second reaction zone, this does not eliminate the possibility that other reactions, such as alkylation, polymerization, for example, may affect some portion of the components present in the reaction zone.

The catalyst used in my invention comprises an oxide of aluminum promoted by an oxide of molybdenum and, preferably, additionally promoted by an oxide of cobalt. According to my invention, the compositional ranges of the catalysts are as follows:

|  | Percent |
|---|---|
| $MoO_3$ | 0.5–30 |
| $CoO$ | 0.0–20 |
| $Al_2O_3$ | 50–99.5 |

Preferred ranges for the composition of the catalyst for the practice of my invention are as follows:

|  | Percent |
|---|---|
| $MoO_3$ | 1–15 |
| $CoO$ | 1–5 |
| $Al_2O_3$ | 80–98 |

The composite catalyst may be prepared by any conventional method such as dry mixing or impregnation. For example, a 10–100 mesh alumina (having a 178 m.²/g. surface area and a 107 A. pore diameter) is impregnated with an aqueous solution of a molybdenum compound, such as ammonium molybdate, which is convertible to the oxide upon calcination. A commercially available catalyst comprising 12.8:3.8:83.4 $MoO_3$–$CoO$–$Al_2O_3$ having a 208 m.₂/g. surface area and a 96 A. pore diameter is also satisfactory.

Before use in the disproportionation reaction, the above-identified composite catalysts are activated by a heat treatment. The catalysts are subjected to 700–1600° F. for 0.5–20 hours or longer in air. In some cases the solid is serially heated in more than one gas. For example, the catalyst can be heated in air, then in nitrogen or other inert gas, then in carbon monoxide or hydrogen.

Preferred reaction conditions, for example temperature, pressure, flow rates, etc., for the first reaction zone vary somewhat depending on the specific catalyst composition, the particular feed olefin, desired products, etc. However, the process is carried out at a temperature in the range of 250 to 450° F., preferably 300 to 400° F., at pressures in the range of 0 to 1000 p.s.i.g., preferably 250 to 600 p.s.i.g., with a residence time in the range of 0.1 minute to 10 hours, preferably 0.5 minute to 2 hours. Preferably the reaction is carried out continuously, although it can be accomplished batchwise. Contact with the catalyst can be made using a fixed catalyst bed, a stirrer-equipped reactor or other mobile catalyst contacting means as well as other known contacting techniques.

The effluent from the first reaction zone is passed into a separation zone. Preferably the light product is removed in one stream, the heavy product in another stream, and an intermediate stream removed and fed to the second reaction zone. Olefins which are subjected to disproportionation in this second zone include acyclic 1- and 2-alkenes having from 3 to 20 carbon atoms, preferably from 5 to 15 carbon atoms. Some specific examples of such olefins are propylene, 1-butene, 2-butene, 1-pentene, 2-pentene, 1-hexene, 2-heptene, 1-octene, 2-nonene, 1-dodecene, 2-tetradecene, 1-hexadecene, and 3-methyl-1-butene. The catalysts used in the second reaction zone can be the same catalysts, that is catalysts of the same composition and preparation as used in the first reaction zone. However, the conditions of operation generally are milder in the second reaction zone. In the second zone the process is carried out at a temperature in the range of 150 to 400° F., preferably 200 to 350° F., at a pressure of 100 to 1000 p.s.i.g., preferably 200 to 400 p.s.i.g., with a contact time in the range of 0.1 minute to 10 hours, preferably 0.5 minute to 2 hours.

The disproportionation reactions can be carried out either in the presence or absence of a diluent. Diluents selected from the group consisting of paraffinic and cycloparaffinic hydrocarbons can be employed. Suitable diluents are, for example, cyclohexane, methylcyclohexane, normal pentane, normal hexane, isooctane, dodecane, and the like, or mixtures thereof, including primarily those paraffins and cycloparaffins having up to 12 carbon atoms per molecule.

At the end of the reaction period, the hydrocarbon phase is separated from the solid catalyst by known means and subjected to product recovery. Such techniques as fractionation, solvent extraction, and the like, can be employed for separation of products. Unconverted feed materials or products not in the desired range can be recycled.

In the drawing, reactor 11 is connected with a source of olefin feed through inlet line 12 which passes in indirect heat exchange with the product from reactor 11 in heat exchanger 13 and is further heated in heater 14. The product passes through outlet line 16, through heater 13, and into fractionator 17. The light overhead product is condensed in condenser 18 and passed into accumulator 19 from which the product is passed through pump 21 as reflux for the fractionator 17 and through pump 22 to product recovery, generally indicated as separation zone 23. Here light products of varying molecular weight are separately removed to product removal lines 26, 27, 28 or through other lines for other products as desired. Materials outside the desired product range which for any reason it is desired to recycle are passed through recycle line 29 to inlet line 12.

The heavier material is removed through bottoms outlet 31 to separation zone 32, which in this instance is illustrated as a distillation column. Heat is added to column 17 by passing a portion of the bottoms product through reboiler 33 back into the bottom of column 17. The overhead products from separator 32 can be condensed in condenser 36, accumulated in accumulator 37 and pumped by means of pump 38 to reflux line 39 or product line 41. The bottoms product is removed through outlet 42, a portion recycled through reboiler 43 and the remainder removed through product line 44.

A vapor drawoff is provided from zone 17 through line 46 to a second disproportionation reactor 47, the product of which is additionally heated in heater 48 and pumped by means of pump 49 through line 50 back into the feed to fractionator 17.

My invention is valuable in the disproportionation of propylene to ethylene and heavier olefins. In the first reactor the feed stream is converted generally to butylenes, pentenes and ethylene. The vapor draw from fractionator 17 comprises pentenes and heavier, up to about $C_{11}$ maximum, which passes through second reactor 48 which operates at less severe conditions than reactor 11 since pentenes and heavier olefins are more reactive than the lighter feed components to reactor 11. In the second reactor even heavier olefins such as $C_{12}$ to $C_{20}+$, as well as some $C_4$ and lighter olefins, are produced. The effluent from the second reactor then re-enters the fractionator above the vapor draw such that the low molecular weight olefins are removed overhead and the $C_5$ to $C_{11}$ olefins can again be recycled to the second disproportionation reactor, while heavier olefins are removed as the kettle product.

In an example according to my invention, with a catalyst comprising 12.8 weight percent $MoO_3$, 3.8 weight percent CoO, and 83.4 weight percent $Al_2O_3$, the catalyst being activated at 1000° F. for about 5 hours, a feed stream comprising substantially pure propylene is fed into the reactor 11. The temperature in reactor 11 is 400° F., the pressure 450 p.s.i.g., and the contact time 2 hours. In reactor 47 the temperature is 250° F., the pressure is 300 p.s.i.g. and the contact time is 2 hours. The composition of the various streams in the lines indicated are shown in Table I.

|  | 12 | 16 | 46 | 50 | 31 |
|---|---|---|---|---|---|
|  | Moles Propylene Feed | Moles Prop. DP Eff.[1] | Moles Pentene+Feed—Fractionator Vapor Draw | Moles Pentene+ DP Eff.[1] | Heavy Product |
| $C_2$ |  | 44 |  |  |  |
| $C_3$ | 200 | 100 |  |  |  |
| $C_4$ |  | 45 |  | 4.0 |  |
| $C_5$ |  | 4 | 12.0 | 8.0 |  |
| $C_6$ |  | 2 | 5.0 | 3.0 |  |
| $C_7$ |  |  | 4.0 | 4.0 |  |
| $C_8$ |  |  | 4.0 | 4.0 |  |
| $C_9$ |  |  | 4.0 | 4.0 |  |
| $C_{10}$ |  |  | 3.0 | 3.04 | 0.04 |
| $C_{11}$ |  |  | 0.1 | 0.4 | 0.30 |
| $C_{12}$ |  |  |  | 0.4 | 0.40 |
| $C_{13}$ |  |  |  | 0.5 | 0.50 |
| $C_{14}$ |  |  |  | 0.5 | 0.50 |
| $C_{15}$ |  |  |  | 0.4 | 0.40 |
| $C_{16}$ |  |  |  | 0.2 | 0.20 |
| $C_{17+}$ as $C_{18}$ |  |  |  | 0.1 | 0.10 |

[1] Disproportionation reactor effluent.

My invention finds particular utility in the production of acyclic olefins from which alkyl benzene is produced for the production of detergents. So that the detergents can be bio-degradable, it is preferred that the olefin branching be held as low as is practical. By the practice of my invention the heavy product comprises a mixture of linear olefins and olefins having relatively few tertiary carbon atoms, thereby producing a stream having substantially lesser amount of branching than when the product is used in the preparation of detergents; preferably the separation is made to include $C_8$ through $C_{20}$ olefins, preferably $C_{11}$ through $C_{15}$.

Reasonable variation and modification are possible within the scope of my invention which sets forth method and apparatus for the disproportionation of acyclic olefin hydrocarbons in two stages, and a product of a two-stage disproportionation comprising a mixed stream of linear and lightly-branched heavier olefins.

I claim:
1. A process for the disproportionation of an acyclic olefin hydrocarbon, which comprises:
   contacting said hydrocarbon with a catalyst comprising oxides of molybdenum and aluminum in a first reaction zone under conditions including a temperature in the range of 250 to 450° F. to produce a first disproportionated product;
   passing said first disproportionated product into a separation zone;
   separating said product into a relatively low molecular weight fraction, an intermediate molecular weight fraction, and a relatively high molecular weight fraction;
   recovering said relatively low molecular weight fraction as a first product;
   recovering said relatively high molecular weight fraction as a second product;
   contacting said intermediate molecular weight fraction with a catalyst comprising oxides of molybdenum and aluminum in a second reaction zone under conditions including a temperature in the range of 150 to 400° F. to produce a second disproportionated product comprising additional relatively low molecular weight fraction and additional relatively high molecular weight fraction; and
   passing said second disproportionated product into said separation zone.

2. A process for the disproportionation of an acyclic olefin hydrocarbon, which comprises:
   contacting said hydrocarbon with a disproportionation catalyst in a first reaction zone under conditions to produce a first disproportionated product;
   passing said first disproportionated product into a separation zone;
   separating said product into a relatively low molecular weight fraction, an intermediate molecular weight fraction, and a relatively high molecular weight fraction;
   recovering said relatively low molecular weight fraction as a first product;
   recovering said relatively high molecular weight fraction as a second product;
   contacting said intermediate molecular weight fraction with a disproportionation catalyst in a second reaction zone under conditions to produce a second disproportionated product comprising additional relatively low molecular weight fraction and additional relatively high molecular weight fraction; and
   passing said second disproportionated product into said separation zone.

3. A disproportionation process, which comprises:
   contacting an acyclic olefin hydrocarbon selected from a group consisting of 1-alkenes and 2-alkenes having 3 to 5 carbon atoms with a first amount of catalyst comprising 0.5 to 30 weight percent oxide of molybdenum, 0.0 to 2.0 weight percent oxide of cobalt and 5.0 to 99.5 weight percent oxide of aluminum at a pressure in the range of zero to 1,000 p.s.i.g. at a temperature in the range of 250 to 450° F. for a time in the range of 0.1 minute to 10 hours to produce a first disproportionated product;
   separating said product into a relatively low molecular weight fraction and a relatively high molecular weight fraction;
   recovering said relatively low molecular weight fraction;
   contacting at least a portion of said relatively high molecular weight fraction comprising an acyclic olefin hydrocarbon selected from the group consisting of 1-alkenes and 2-alkenes having 3 to 20 carbon atoms with a second amount of catalyst comprising 0.5 to 30 weight percent oxide of molybdenum, 0.0 to 20 weight percent oxide of cobalt, and 50 to 99.5 weight percent oxide of aluminum at a pressure in the range of 100 to 1000 p.s.i.g. and a temperature in the range of 150 to 400° F. for a time in the range of 0.1 minute to 10 hours to produce a second disproportionated product; and
   recovering said second product.

4. A disproportionation process, which comprises:
   contacting a hydrocarbon selected from the group consisting of 1-alkenes and 2-alkenes having 3 to 4 carbon atoms with a first amount of catalyst comprising 1 to 15 weight percent oxide of molybdenum, 1 to 5 weight percent oxide of cobalt, and 80 to 98 weight percent oxide of aluminum, at a pressure in the range of 250 to 600 p.s.i.g. at a temperature in the range of 250 to 450° F. with a contact time in the range of 0.5 minute to 2 hours;
   separating said product into a relatively low molecular weight fraction and a relatively high molecular weight fraction;
   recovering said relatively low molecular weight fraction
   contacting at least a portion of said relatively high molecular weight fraction comprising an acyclic olefin hydrocarbon selected from the group consisting of 1-alkenes and 2-alkenes having 5 to 15 carbon atoms with a second amount of catalyst comprising 1 to 15 weight percent oxide of molybdenum, 1 to 5 weight percent oxide of cobalt, and 8 to 98 weight percent oxide of aluminum at a pressure in the range of 200 to 400 p.s.i.g. at a temperature in the range of 150 to 450° F. with a contact time within the range of 0.5 minute to 2 hours to produce a second disproportionated product; and
   recovering said second product.

5. A disproportionation process, which comprises:
   contacting an acyclic olefin hydrocarbon selected from the group consisting of 1-alkenes and 2-alkenes having from 3 to 5 carbon atoms with a catalyst comprising 0.5 to 30 weight percent oxide of molybdenum, 0.0 to 20 weight percent oxide of cobalt, and 50 to 99.5 weight percent oxide of aluminum at a temperature in the range of 250 to 450° F. at a pressure in the range of 0 to 1000 p.s.i.g. with a contact time in the range of 0.1 minute to 10 hours to produce a first disproportionated product;
   passing said first disproportionated product into a separation zone;
   separating said product into a relatively low molecular weight fraction, an intermeniate molecular weight fraction, and a relatively high molecular weight fraction;
   recovering said relatively low molecular weight fraction as a first product;
   recovering said relatively high molecular weight fraction as a second product;
   contacting said intermediate molecular weight fraction comprising an acyclic olefin hydrocarbon selected from the group consisting of 1-alkenes and 2-alkenes having 3 to 20 carbon atoms with a catalyst comprosing 0.5 to 30 weight percent oxide of molybdenum, 0.0 to 20 weight percent oxide of cobalt, and 50 to 99.5 weight percent oxide of aluminum at a temperature in the range of 150 to 400° F. at a pressure in the range of 100 to 1000 p.s.i.g. with a contact time in the range of 0.1 minute to 10 hours to produce a second disproportionated product comprising additional relatively low molecular weight fraction and additional relatively high molecular weight fraction; and
   passing said second disproportionated product into said separation zone.

6. A disproportionation process, which comprises:
   contacting an acyclic olefin hydrocarbon selected from the group consisting of 1-alkenes and 2-alkenes having 3 to 4 carbon atoms with a catalyst comprising 1 to 15 weight percent oxide of molybdenum, 1 to 5 weight percent oxide of cobalt, and 80 to 98 weight percent oxide of aluminum at a temperature in the range of 250 to 450° F. at a pressure in the range of 250 to 600 p.s.i.g. with a contact time in the range of 0.5 minute to 2 hours to produce a first disproportionated product;

passing said first disproportionated product into a separation zone;

separating said product into a relatively low molecular weight fraction, an intermediate molecular weight fraction, and a relatively high molecular weight fraction;

recovering said relatively low molecular weight fraction as a first product;

recovering said relatively high molecular weight fraction as a second product;

contacting said intermediate molecular weight fraction comprising an acyclic olefin hydrocarbon selected from the group consisting of 1-alkenes and 2-alkenes having 5 to 15 carbon atoms with a catalyst comprising 1 to 15 weight percent oxide of molybdenum, 1 to 5 weight percent oxide of cobalt and 80 to 98 weight percent oxide of aluminum at a temperature in the range of 150 to 400° F. at a pressure in the range of 200 to 400 p.s.i.g. with a contact time in the range of 0.5 minute to 2 hours to produce a second disproportionated product comprising additional relatively low molecular weight fraction and additional relatively high molecular weight fraction; and passing said second disproportionated product into said separation zone.

7. A disproportionation process, which comprises:

contacting an acyclic olefin hydrocarbon selected from the group consisting of 1-alkenes and 2-alkenes having 3 to 5 carbon atoms with a first amount of catalyst comprising 0.5 to 30 weight percent oxide of molybdenum, 0.0 to 20 weight percent oxide of cobalt, and 50 to 99.5 weight percent oxide of aluminum at a pressure in the range of 0 to 1000 p.s.i.g. at a temperature in the range of 250 to 450° F. to produce a first disproportionated product;

separating said first product into a relatively low molecular weight fraction and a relatively high molecular weight fraction;

recovering said relatively low molecular weight fraction as a first product;

contacting at least a portion of said relatively high molecular weight fraction comprising an acyclic olefin hydrocarbon selected from the group consisting of 1-alkenes and 2-alkenes having 3 to 20 carbon atoms with a second amount of catalyst comprising 0.5 to 30 weight percent oxide of molybdenum, 0.0 to 20 weight percent oxide of cobalt, and 50 to 99.5 weight percent oxide of aluminum at a pressure in the range of 100 to 1000 p.s.i.g. and a temperature in the range of 150 to 400° to produce a second disproportionated product; and passing said second disproportionated product into said separation zone.

References Cited by the Examiner

UNITED STATES PATENTS

| | | | |
|---|---|---|---|
| 2,614,137 | 10/1952 | Chenicek | 260—683 X |
| 2,692,259 | 10/1954 | Peters | 260—683.15 |
| 2,768,225 | 10/1956 | Moore | 260—683 |
| 2,780,617 | 2/1957 | Zletz | 260—683.15 |
| 2,825,721 | 3/1958 | Hogan et al. | 260—683.15 X |
| 2,852,579 | 9/1958 | Walkey | 260—683.15 |

DELBERT E. GANTZ, *Primary Examiner.*

A. D. SULLIVAN, *Examiner.*

C. E. SPRESSER, *Assistant Examiner.*